Nov. 13, 1928.

C. W. MORTIMER 1,691,903

PROCESS FOR PERFORMING CHEMICAL REACTIONS

Filed April 17, 1923     2 Sheets-Sheet 1

Charles W. Mortimer, Inventor

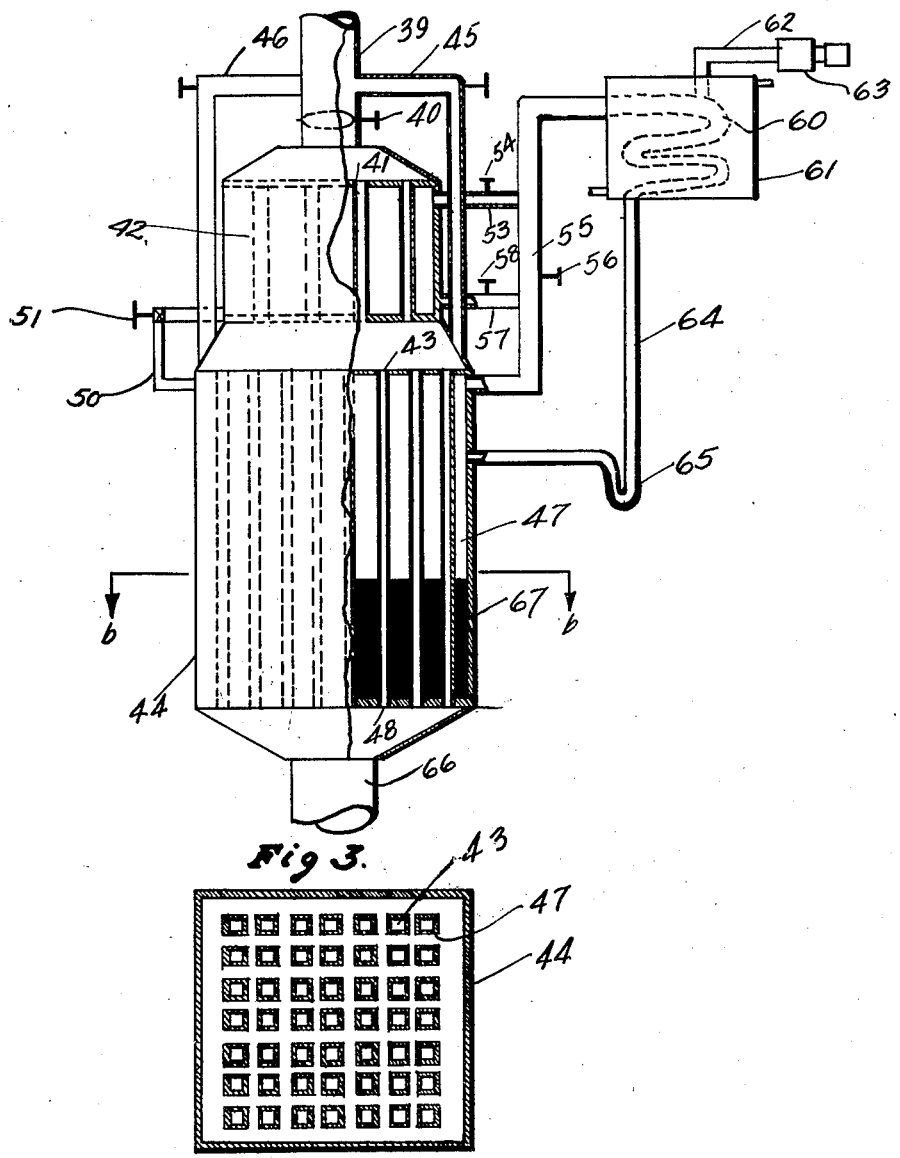

Patented Nov. 13, 1928.

1,691,903

UNITED STATES PATENT OFFICE.

CHARLES W. MORTIMER, OF BROOKLYN, NEW YORK.

PROCESS FOR PERFORMING CHEMICAL REACTIONS.

Application filed April 17, 1923. Serial No. 632,620.

This invention relates to a process for promoting chemical reactions especially in the vapor phase, and for controlling and utilizing the heat generated thereby. It relates more particularly to a process in which exothermic chemical reactions are promoted by the presence of a catalyst and in which the heat is removed as latent heat of vaporization of a liquid. By the present invention either all or a portion of the materials, in which chemical reactions are to be promoted, can be heated by heat that is absorbed as latent heat of vaporization of the liquid that is used for cooling purposes and either all or a portion of the vapors resulting from vaporization of the cooling liquid may be brought into heat transferring relationship with a part or all of the incoming gases that are to undergo chemical reactions. In this way heat that might otherwise be wasted can be utilized, the amount of preheating of the incoming gases can be easily regulated, and at the same time temperatures in the system can be controlled to some extent. Pressure in the cooling system may be regulated thus facilitating the maintenance of the desired temperatures.

The invention will be understood from the description in connection with the accompanying drawings, in which Fig. 1 is an elevation partly in section showing an arrangement of apparatus for carrying out the invention;

Fig. 3 is an elevation partly in section showing a modification; and

Fig. 4 is a section taken along the line b—b of Fig. 3.

Figure 1:
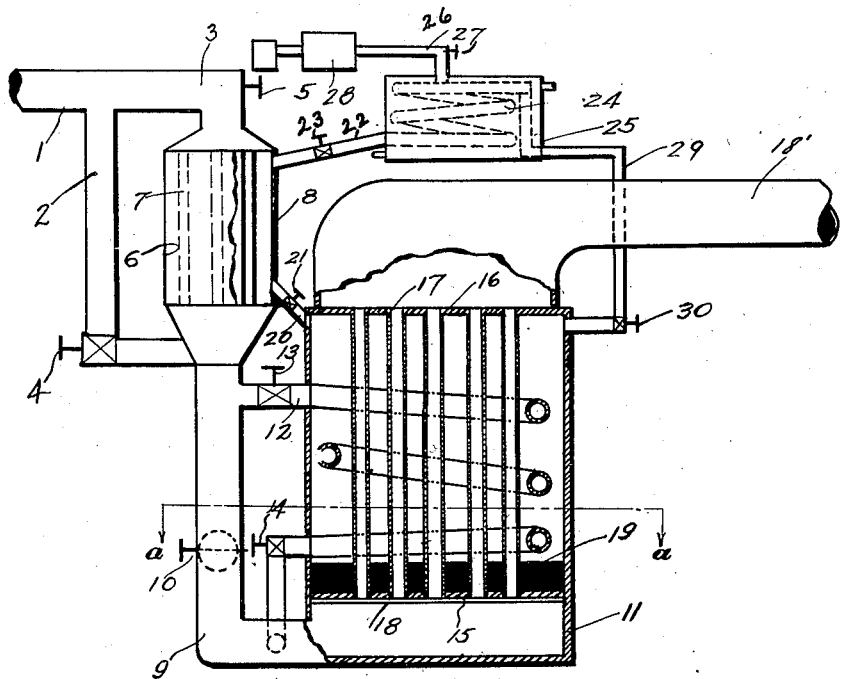
Figure 2:
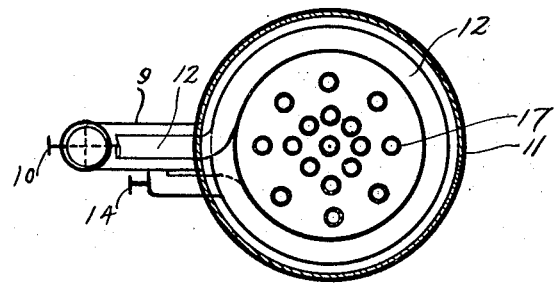
Fig. 2 is a section along the line a—a of Fig. 1.

In the drawings reference character 1 indicates an inlet for materials preferably in the vapor phase that are to be subjected to a catalytic reaction. The inlet 1 divides into two branches 2 and 3 having valves 4 and 5 therein to regulate the portion of gases passing through each or permitting all of the gases to pass through either one. The branch 3 passes into a heat exchanger 6 that is provided with tubes 7 through which the gases may pass, these tubes being in a housing 8 for receiving surrounding hot gases that may impart heat to the tubes. The branch 2 joins the branch 3 below the heat exchanger 6 forming the pipe 9 provided with a valve 10 which leads into the bottom of the reaction chamber 11. A branch pipe 12 provided with a valve 13 leads from the pipe 9 through the reaction chamber 11 and back through the valve 14 into the pipe 9.

The reaction chamber 11 is provided with perforated plates or headers 15 and 16 connected by tubes 17 in such a manner that the reacting gases can pass through the tubes 17 and out through the outlet 18'. The tubes 17 may be filled to the desired depth with catalytic material preferably in granular form or deposited upon granular carriers such as pumice, etc., so that the gases can pass into intimate contact with the catalyst but are permitted to pass through the tubes 17 between the interstices of the granular or catalytic material. A wire netting or the like 18 may extend across the bottom of the plate 15 so as to prevent the catalytic material from falling out.

Liquid 19 such as mercury, for example, may be introduced into the reaction chamber 11 in the spaces between the plates 15 and 16 so as to surround the tubes 17. This space in which the liquid is placed is connected at its upper portion by means of the pipe 20 provided with a valve 21 to the housing 8 surrounding the tubes 7 of the heat exchanger 6 and from this housing a pipe 22 provided with a valve 23 leads to the condenser coil 24 in the condenser 25. The condenser coil may be connected by means of a pipe 26 having a valve 27 with the vacuum or pressure pump 28. Another pipe or pipes 29 provided with a valve or valves 30 leads directly from the upper portion of the space surrounding the tube 17 in the reaction chamber 11 to the condenser coil 24.

The operation is as follows: Reaction gases, for example, hydrocarbons such as benzine, naphthalene or anthracene, etc., mixed with a proper proportion of oxygen containing gases such as air are introduced in the vapor phase through pipe 1 and by regulation of the valves 4 and 5 as much as is desired of this mixture may be passed through the heat exchanger 6 where it will become heated. Also a portion or all of these gases may by regulation of the valves 10 and 13 be caused to pass directly into the reaction chamber 11, or a part or all of these gases may be diverted through the pipe 12 and become further heated in the vapor space of the reaction chamber 11 after which these gases pass in their heated state through the tubes 17 and undergo catalytic oxidation to produce the desired products.

The catalyst in the tubes 17 may be initially heated in any convenient way to a sufficiently high temperature to cause the desired reaction to take place after which the heat developed by the reaction will tend to raise the temperature and the excess heat must be removed to prevent the temperature from rising too much. Due to the fact that a cooling liquid 19 of the proper boiling point surrounds the lower ends of the tubes 17 in which the catalyst is placed, the heat of reaction will be transmitted to this liquid and the same will become vaporized, the vapors rising and heating the gases, if any, that are passing through the pipe 12. Such a cooling liquid 19 should be used that its boiling is, or can readily be made to be by regulating the pressure thereon, sufficiently below the catalyst temperature to provide a temperature gradient which will cause heat removal at the proper rate when the process is in operation. The vapors from this liquid when boiled may be made to divide, if desired, by manipulation of the valves 21 and 30 to cause the desired amount of these vapors to pass into the housing 8 and give up heat to the gases passing through the tubes 7 thus condensing these vapors and causing the condensate to pass back into the space surrounding the tubes 17 in the reaction chamber 11. The portion of the vapors, if any, that are uncondensed in the heat exchanger 6 and the portion that may be permitted to pass upwardly through the pipe 29 are condensed in the coil 24 and the condensate passes back into the reaction chamber 11. If desired, the boiling point of the cooling liquid surrounding the tube 17 may be varied by operating the vacuum or pressure pump 28 thus maintaining the pressure of this liquid at the desired point to cause the same to vaporize at the appropriate temperature. The reaction products after having passed through the tubes 17 and undergone reactions are passed through the outlet 18′ into appropriate apparatus where they can be separated or utilized.

In the modification shown in Fig. 3, the reaction gases may enter through the pipe 39 provided with a valve 40 and pass through the tubes 41 in heat exchanger 42 and then through the tubes 43 of the reaction chamber 44. However, a portion of the reaction gases may be diverted through the pipes 45 and 46 so as not to pass through the tubes 41. The reaction chamber 44 is somewhat similar to the reaction chamber 11 in that the tubes 43 are surrounded by spaces 47 in which the cooling liquid 67 is placed. The catalyst is placed inside the tubes 43 and may be held therein by a wire screen 48. A pipe 50 provided with a valve 51 leads from the upper part of the space surrounding the tubes 43 into the heat exchanger 42 from the upper portion of which a pipe 53 provided with a valve 54 is connected to the pipe 55 provided with a valve 56. A pipe 57 provided with a valve 58 also leads from the pipe 55 to the housing 42. The pipe 55 leads from the upper portion of the space 47 of reaction chamber 44 to a condenser coil 60 placed in the condenser 61 and a pipe 62 leads from the upper portion of the condenser coil 60 to a vacuum or pressure pump 63 and a return pipe 64 provided with a vapor trap 65 leads from the lower end of the condenser coil 60 to the space 47 surrounding the tubes 43 in the reaction chamber 44. The reaction gases after passing through the tubes 43 pass through the outlet pipe 66 to condensers, scrubbers, absorbers, or other devices where the products of reaction can be separated from each other in the usual and well known manners.

The operation is somewhat similar to that described in connection with Fig. 1. The incoming gases can be subjected wholly or in part to a preliminary heating in heat exchanger 42 and then be caused to pass through the tubes 43 in which the catalyst is placed, these tubes not being permitted to exceed a certain temperature range because of the heat absorbed by latent heat of vaporization of the liquid 67 surrounding the lower portion of them. It will be noted that in this figure the reacting gases in the tubes 43 while in the space 47 above the liquid 67 will be subjected to the heat of the hot vapors and will absorb heat thereby, the amount of this heat absorption being determined in part by the length of the tubes and the depth of the cooling liquid surrounding these tubes. A part or all of the vapors from the cooling liquid 67 may be passed through the heat exchanger 42 to cause preliminary heating of incoming gases.

I claim:

1. In a process for utilizing the heat generated in exothermic catalytic reactions between gases in which the reaction temperature is regulated by the boiling point of a liquid; the steps which comprise dividing the vapor of said liquid, dividing the incoming gases, heating a portion of the incoming gases with one portion of the vapor and separately condensing the other portion of the vapor.

2. In a process for utilizing the heat generated in exothermic catalytic reactions between gases in which the reaction temperature is regulated by the boiling point of a liquid; the steps which comprise dividing the vapor of said liquid, dividing the incoming gases, heating a portion of the incoming gases with one portion of the vapor and separately condensing the other portion of the vapor, mixing the heated and unheated portions of the gases and bringing the resultant mixture into contact with the catalyst.

3. In a process for utilizing the heat generated in exothermic catalytic reactions between gases in which the reaction temperature is regulated by the boiling point of a liquid; the steps which comprise dividing the vapor of said liquid, heating at least a portion of the incoming gases with one portion of the vapor and separately condensing the other portion thereof.

4. In a process for utilizing the heat generated in exothermic catalytic reactions between gases in which the reaction temperature is regulated by the boiling point of a liquid; the steps which comprise dividing the vapor of said liquid, heating at least a portion of the incoming gases with one portion of the vapor, condensing both portions of the vapor, returning the condensate and absorbing heat of reaction with the same.

5. In a process for utilizing the heat generated in exothermic catalytic reactions between gases in which the reaction temperature is regulated by the boiling point of a liquid; the steps which comprise dividing the vapor of said liquid, regulating the pressure on said vapor, heating at least a portion of the incoming gases with one portion of the vapor, and condensing said vapor.

In testimony whereof I affix my signature.

CHARLES W. MORTIMER.